P. L. HUSSEY.
MOTOR VEHICLE.
APPLICATION FILED SEPT. 6, 1910.
1,009,841.
Patented Nov. 28, 1911.
2 SHEETS—SHEET 1.
Fig. 1
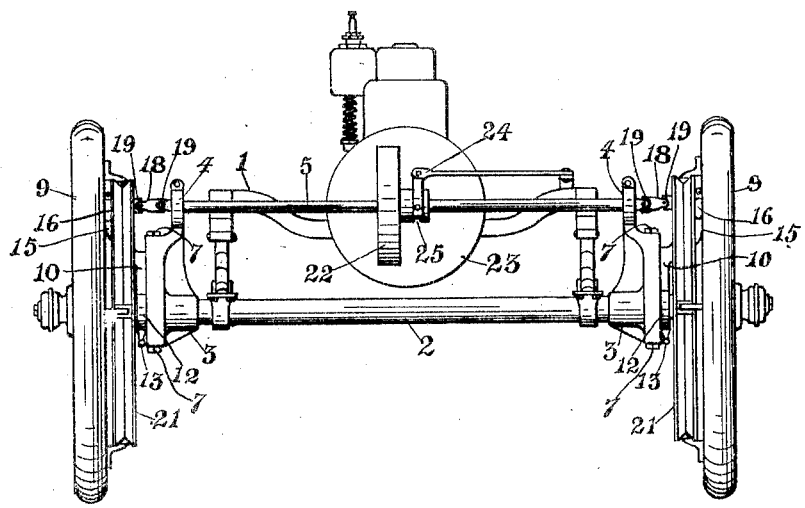
Fig. 4
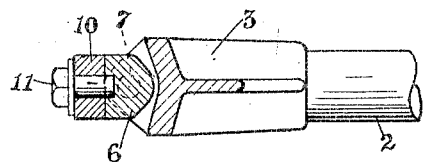
Witnesses
A. M. Shannon
A. M. Dorr
Inventor
PATRICK L. HUSSEY
Attorneys

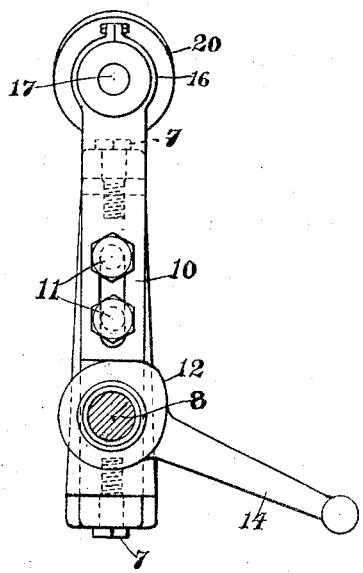
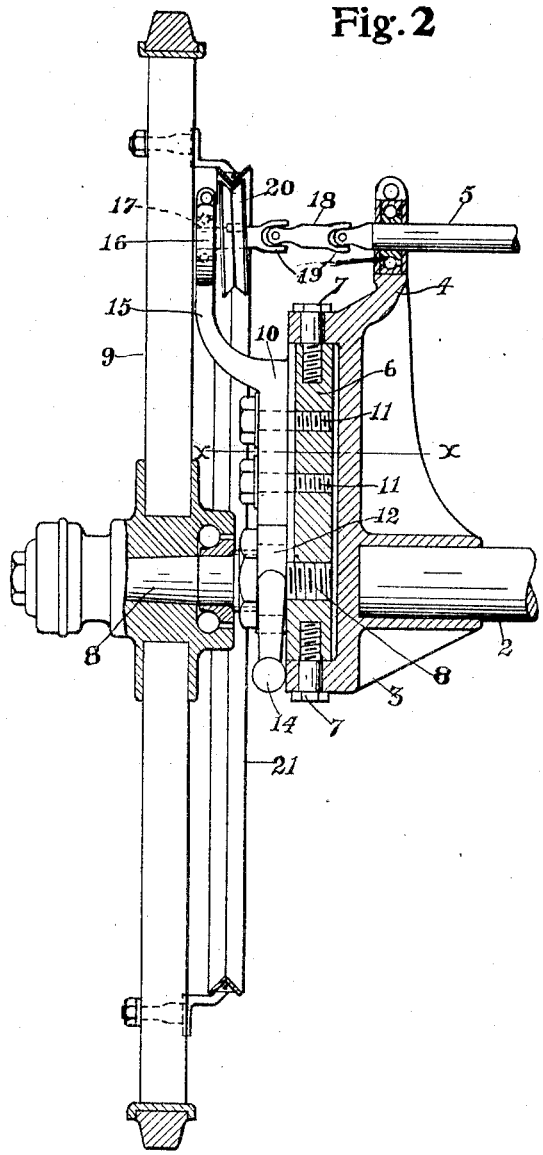

UNITED STATES PATENT OFFICE.

PATRICK L. HUSSEY, OF CLEVELAND, OHIO.

MOTOR-VEHICLE.

1,009,841.

Specification of Letters Patent. Patented Nov. 28, 1911.

Application filed September 6, 1910. Serial No. 580,571.

*To all whom it may concern:*

Be it known that I, PATRICK L. HUSSEY, a citizen of the United States of America, residing at Cleveland, in the county of Cuyahoga and State of Ohio, have invented certain new and useful Improvements in Motor-Vehicles, of which the following is a specification, reference being had therein to the accompanying drawings.

This invention relates to transmission mechanism for automobiles and more particularly to an arrangement thereof for driving the steering or dirigible bearing wheels of a vehicle.

The invention consists in the matters hereinafter set forth, and more particularly pointed out in the appended claims.

In the drawings, Figure 1 is a view in front elevation of an automobile chassis and steering bearing wheels equipped with transmission mechanism that embodies features of the invention; Fig. 2 is a view partly in elevation and partly in section of a steering bearing wheel and the driving connections thereof; Fig. 3 is a view in detail of releasing means; Fig. 4 is a view in section on line $x$—$x$ of Fig. 2.

As herein indicated, a chassis 1 has a forward axle 2 with a pair of steering brackets 3 at its extremities provided with upwardly extending bearing arms 4 in which a friction follower shaft 5 is journaled. A pair of steering wheel spindles 6 are journaled in upright position in the brackets 3 as by pivot studs 7 and are each provided with the usual journals 8 for bearing wheels 9 which are mounted thereon in any preferred conventional manner.

A slide member 10 may be vertically reciprocated on the outer face of the spindles 6, as on studs 11 engaging a slot in the slide, by means of a cam 12 pivotally secured on the face of the member 6 on the journal 8, the lower end of the slide riding on the periphery of the cam. The cam may be turned by means of a suitable arm 14.

An extension 15 at the upper end of the slide member that extends close to the inner face of the adjacent bearing wheel has a bearing 16 at its upper end in which a friction pulley journal 17 is loosely rotatable. The journal is connected to the shaft 5 by a coupling 18 whose ends are severally connected to the adjacent ends of the journal and shaft by universal joints 19 of any preferred type having sufficient play to permit a slight longitudinal movement of the parts due to their different arcs of motion.

A friction pulley 20 preferably with grooves or V-shaped periphery is carried on the journal 17 and is adapted to engage a friction ring 21 secured concentrically with the journal 8 on the face of the bearing wheel.

The transverse shaft 5 may be driven by any preferred means, and is herein shown as being operated by a friction drive pulley 22 non-rotatable and reciprocable on the shaft across the end faces of a fly wheel 23 of the car motor. The pulley may be shifted by any preferred means as for example, a suitable yoke 24 whose forked ends embrace a groove 25 in the periphery of the pulley hub.

The usual steering wheel connections are provided and any preferred means for swinging the arms 14 to throw the pulleys 20 in and out of frictional contact with the rings 21. By this method of construction the forward or steering bearing wheels of an automobile may be driven in any position from the car motor which may also be coupled in any preferred manner to the other pair of bearing wheels. This affords a four-wheel drive for the vehicle which is especially desirable on trucks, commercial cars, or the like.

Obviously, changes in the details of construction may be made without departing from the spirit of the invention and I do not wish to limit myself to any particular form or arrangement of parts.

I claim as my invention:

1. The combination with an axle, steering-knuckles pivoted thereon, traction wheels journaled on said knuckles, means for swinging said knuckles, and a friction rim on each traction wheel, of a yoke slidable on each knuckle, a friction pulley journaled on each yoke, means for moving each yoke to bring its pulley into and out of coöperation with said friction rim pertaining thereto, a power-driven shaft journaled on said axle and extending between and free of said yokes, and a flexible shaft-connection between the power-driven shaft and each pulley.

2. The combination with an axle, steering knuckles vertically pivoted thereon, traction wheels journaled on said knuckles, means for swinging said knuckles, and a friction rim on each traction wheel, of a yoke vertically slidable on each knuckle, a friction pulley journaled on each yoke, means for moving each yoke vertically to bring its pulley into and out of coöperation with the friction rim pertaining thereto, a power-driven shaft journaled on said axle and extending between and free of said yokes, and a flexible shaft-connection between the power-driven shaft and said pulley.

3. The combination with an axle, a steering knuckle vertically pivoted thereon, a traction wheel journaled on said knuckle, means for swinging said knuckle, and a friction rim on the traction wheel, of a bracket fixed on the axle, a power driven shaft journaled in said bracket, a yoke slidable on said bracket in radial direction relatively to the axis of the traction wheel journal, a pulley journaled on said yoke, a flexible shaft for rotatively connecting said shaft and pulley, and means for moving said yoke on the bracket to bring the rim and pulley into and out of peripheral frictional contact with each other.

4. The combination with an axle, a steering knuckle vertically pivoted thereon, a traction wheel journaled on said knuckle, means for swinging said knuckle, and a friction rim on the traction wheel, of a bracket on the axle, a power driven shaft journaled in said bracket, a yoke slidable on said bracket in radial direction relatively to the axis of the traction-wheel journal, a pulley journaled on said yoke, a flexible shaft for rotatively connecting said shaft and pulley, and a cam pivoted on said bracket for moving said yoke on the bracket to bring the rim and pulley into and out of peripheral frictional contact with each other.

5. The combination with an axle, steering-knuckles pivoted thereon, traction wheels journaled on said knuckles, means for swinging said knuckles, and a friction rim on each traction wheel and having an internal friction face, of a yoke slidable on each knuckle, a friction pulley journaled on each yoke, means for raising each yoke to bring its pulley into and out of coöperation with said friction rim pertaining thereto, a power-driven shaft journaled on said axle and extending between and free of said yokes, and a flexible shaft-connection between the power-driven shaft and each pulley.

In testimony whereof I affix my signature in presence of two witnesses.

PATRICK L. HUSSEY.

Witnesses:
 A. M. DORR,
 OTTO F. BARTHEL.